US008467840B2

(12) United States Patent
Lin et al.

(10) Patent No.: US 8,467,840 B2
(45) Date of Patent: Jun. 18, 2013

(54) RADIO-FREQUENCY DEVICE AND WIRELESS COMMUNICATION DEVICE

(75) Inventors: Hsiao-Yi Lin, Hsinchu (TW); Jhih-Yuan Ke, Hsinchu (TW); Chih-Ming Wang, Hsinchu (TW)

(73) Assignee: Wistron NeWeb Corporation, Hsinchu Science Park, Hsinchu (TW)

( * ) Notice: Subject to any disclaimer, the term of this patent is extended or adjusted under 35 U.S.C. 154(b) by 0 days.

(21) Appl. No.: 13/442,839

(22) Filed: Apr. 9, 2012

(65) Prior Publication Data

US 2013/0130633 A1 May 23, 2013

(30) Foreign Application Priority Data

Nov. 17, 2011 (TW) ............................ 100142160 A

(51) Int. Cl.
*H04M 1/00* (2006.01)

(52) U.S. Cl.
USPC ... 455/575.7; 455/90.1; 455/90.3; 455/550.1; 455/575.1; 455/575.5

(58) Field of Classification Search
USPC ........... 455/575.7, 550.1, 575.1, 575.5, 90.1, 455/90.3, 522, 552.1, 575.8, 90.2
See application file for complete search history.

(56) References Cited

U.S. PATENT DOCUMENTS

| | | | | |
|---|---|---|---|---|
| 6,657,595 | B1 * | 12/2003 | Phillips et al. | 343/702 |
| 7,805,171 | B2 * | 9/2010 | Alameh et al. | 455/575.2 |
| 8,000,736 | B2 * | 8/2011 | Forstall et al. | 455/550.1 |
| 8,326,385 | B2 * | 12/2012 | Brogle et al. | 455/575.7 |
| 2004/0214621 | A1 * | 10/2004 | Ponce De Leon et al. | 455/575.8 |
| 2007/0238496 | A1 * | 10/2007 | Chung et al. | 455/575.7 |

* cited by examiner

*Primary Examiner* — Pablo Tran
(74) *Attorney, Agent, or Firm* — Winston Hsu; Scott Margo

(57) ABSTRACT

A radio-frequency (RF) device and a wireless communication device include a capacitive sensing unit capable of using a radiating element of an antenna to sensing an environment capacitance within a specified range, such that an RF signal processing device is capable of adjusting power of an RF signal accordingly, to prevent affecting a user. When the radiating element of the antenna includes a direct-current signal route to a ground terminal, the RF device and the wireless communication device further includes at least a capacitor for cutting off the direct-current signal route.

22 Claims, 16 Drawing Sheets

RADIO-FREQUENCY DEVICE AND WIRELESS COMMUNICATION DEVICE

BACKGROUND OF THE INVENTION

1. Field of the Invention

The present invention relates to a radio-frequency (RF) device and wireless communication device, and more particularly, to an RF device and wireless communication device capable of maintaining radiating efficiency, reducing design and manufacturing costs.

2. Description of the Prior Art

A wireless communication device is equipped with an antenna to emit or receive radio waves, so as to exchange radio-frequency (RF) signals and access a wireless communication system. Radio waves are high-frequency sinusoidal signals, such that every country in the world standardizes the power of radio waves, mainly for preventing from affecting users and/or interfering operations of other wireless communication devices. For example, the International Commission on Non-Ionizing Radiation Protection (ICNIRP) suggests the value of Specific Absorption Rate (SAR) shall not exceed 2.0 W/Kg, while the Federal Communications Commission (FCC) suggests the value of SAR shall not exceed 1.6 W/Kg. SAR represents the absorption rate of a living body unit per the power of electromagnetic waves in a normal electromagnetic radiation environment, taking W/Kg as a unit. Additionally, various communication products are applied to various environments, so that distance factor is further taken into consideration. For example, SAR of handset wireless communication device such as mobile device or smart phones needs to be verified when the distance between the handset wireless communication device and a human body is 20 cm.

As well known in the art, antenna efficiency will be affected when reducing interferences caused by the wireless communication device (i.e. reducing SAR value of the wireless communication device). Therefore, to keep the antenna efficiency, the prior art has disclosed many methods. One is using a proximity sensor to detect an event of approach of a human body; that is, reducing RF power when the proximity sensor detects that a human body is approaching, while keeping or appropriately increasing RF power when the proximity sensor does not detect approach of any human body. In such a condition, interference can be reduced, and meanwhile, antenna efficiency is kept. However, the prior art proximity sensor includes a receiver or sensor which contains metal materials to detect capacitance variation when a human body is approaching, so as to determine an event of approach of a human body. In addition, the added receiver or sensor affects the antenna efficiency, such that the operating frequency band becomes narrow. In other words, the operating frequency band of the antenna, which is originally suitable for broadband demand, is narrowed due to the added receiver or sensor of the proximity sensor. In such a condition, multiple antennas must be designed separately for various communication systems of nearing frequency band demands, causing increase of design and manufacturing costs, and disadvantage of component managements.

Therefore, the prior art needs to be improved.

SUMMARY OF THE INVENTION

It is therefore an objective of the present invention to provide an RF device and wireless communication device, for taking both the two demands of reducing interference and keeping antenna efficiency into consideration.

The present invention discloses a radio-frequency (RF) device for a wireless communication device, which comprises a grounding unit for providing grounding, an antenna comprising a radiating element, a signal feed-in unit coupled to the radiating element for transmitting an RF signal to the radiating element to emit the RF signal via the radiating element, and a ground terminal coupled to the grounding unit, a capacitive sensing unit electrically connected to the radiating element of the antenna for sensing an environment capacitance within a specified range via the radiating element, and at least a capacitor coupled between the ground terminal of the antenna and the grounding unit for cutting off a direct-current signal route from the ground terminal to the grounding unit.

The present invention further discloses a wireless communication device, which comprises a radio-frequency (RF) signal processing device for generating an RF signal and adjusting power of the RF signal according to a sensing result, and an RF device, comprising a grounding unit for providing grounding, an antenna comprising a radiating element, a signal feed-in unit coupled to the radiating element for transmitting the RF signal to the radiating element to emit the RF signal via the radiating element, and a ground terminal coupled to the grounding unit, a capacitive sensing unit electrically connected to the radiating element of the antenna for sensing an environment capacitance within a specified range via the radiating element, and at least a capacitor, coupled between the ground terminal of the antenna and the grounding unit for cutting off a direct-current signal route from the ground terminal to the grounding unit.

The present invention further discloses an RF device for a wireless communication device, which comprises an antenna comprising a radiating element, and a signal feed-in unit for transmitting an RF signal to the radiating element to emit the RF signal via the radiating element, and a capacitive sensing unit electrically connected to the radiating element of the antenna for sensing an environment capacitance within a specific range via the radiating element, wherein the signal feed-in unit or the capacitive sensing unit cuts off a direct-current signal route from the radiating element to a ground terminal.

These and other objectives of the present invention will no doubt become obvious to those of ordinary skill in the art after reading the following detailed description of the preferred embodiment that is illustrated in the various figures and drawings.

DETAILED DESCRIPTION

In order to reduce interference and keep antenna efficiency in a wireless communication device, the present invention detects capacitance variation caused by approach of a human body, and adjusts the power of RF signals accordingly. However, instead of utilizing additional receiver or sensor that affects antenna efficiency as in the prior art, the present invention utilizes a radiating element of the antenna for sensing environment capacitance within a specific range and adjusts the power of RF signals accordingly. To clearly describe the concept of the present invention, two major parts according to different antenna types are presented in the following.

Figure 1:
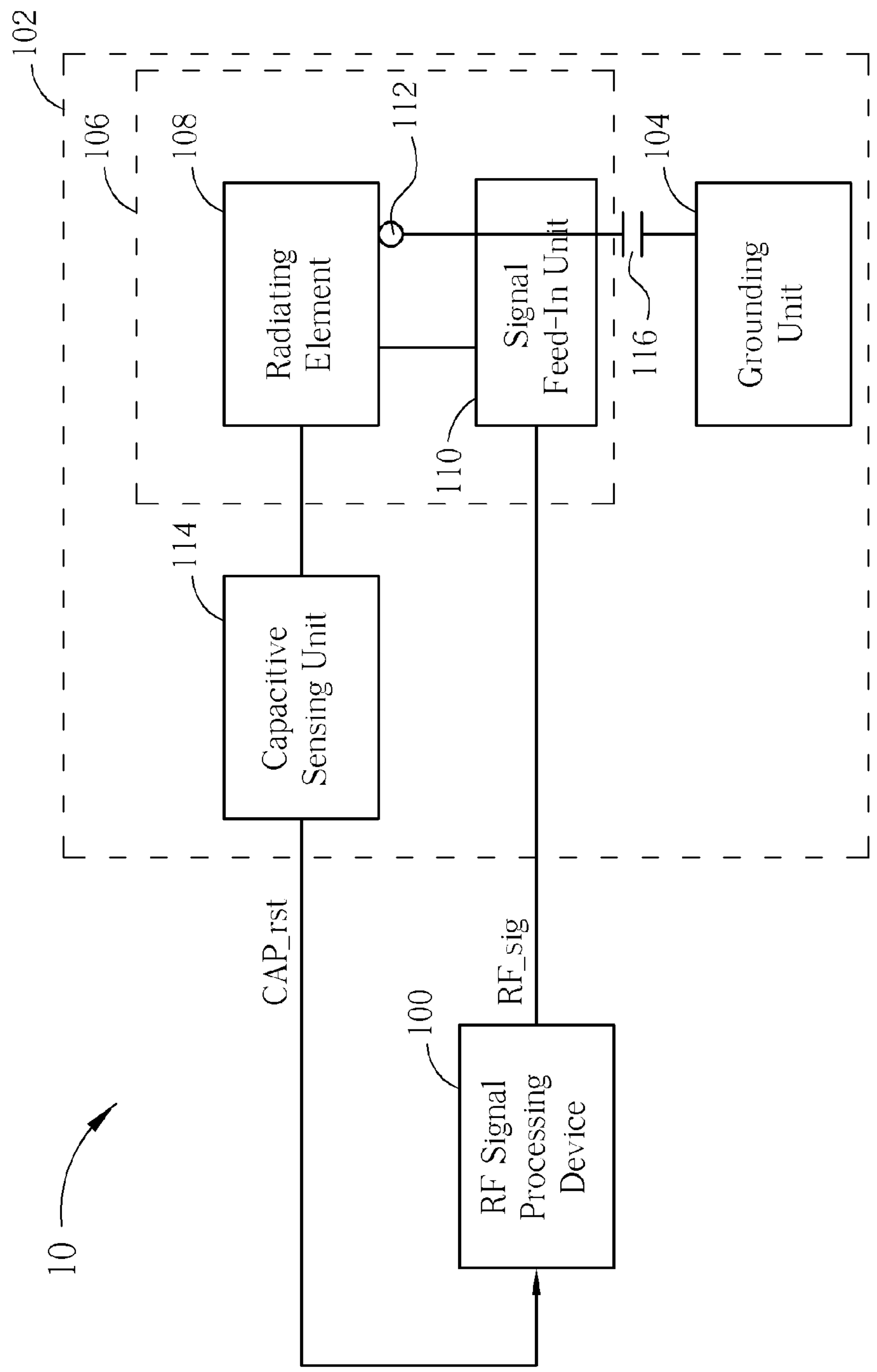
FIG. 1 is a schematic diagram of a wireless communication device according to an embodiment of the present invention.

First, for antennas including direct-current (DC) connecting path between a radiating element and a ground terminal, please refer to FIG. 1, which is a schematic diagram of a wireless communication device 10 according to an embodiment of the present invention. The wireless communication device 10 can be any electronic product having wireless communication functionality, such as mobile phone, computer system, wireless access point, etc., and is briefly composed of an RF signal processing device 100 and an RF device 102. The RF signal processing device 100 is utilized for generating an RF signal RF_sig, and may adjust the power of the RF signal RF_sig according to a sensing result CAP_rst of an environment capacitance sent back from the RF device 102. The RF device 102 includes a grounding unit 104, an antenna 106, a capacitive sensing unit 114, and a capacitor 116. The antenna 106 includes a radiating element 108, a signal feed-in unit 110, and a ground terminal 112. The capacitive sensing unit 114 is electrically connected to the radiating element 108, for sensing an environment capacitance within a specific range via the radiating element 108, and generating the sensing result CAP_rst accordingly. In addition, the capacitor 116 is located between the ground terminal 112 of the antenna 106 and the grounding unit 104, for cutting off a DC signal route from the ground terminal 112 to the grounding unit 104.

In brief, in the wireless communication device 10, the capacitive sensing unit 114 utilizes the radiating element 108 of the antenna 106 for sensing the environment capacitance and transmitting the sensing result CAP_rst to the RF signal processing device 100, such that the RF signal processing device 100 adjusts the power of the RF signal RF_sig accordingly. In addition, because there is a DC connecting path between the antenna 106 and the grounding unit 104, the RF device 102 uses the capacitor 116 to cut off the DC signal path between the ground terminal 112 and the grounding unit 104 for preventing the capacitive sensing unit 114 from sensing the environment capacitance via the grounding unit 104.

The prior art usually determines an event of approach of a human body by utilizing a proximity sensor for sensing capacitance variation caused by approach of the human body. However, the proximity sensor needs to include a receiver or sensor containing metal materials, which affects the antenna efficiency, and narrows the operating frequency band. In comparison, the capacitive sensing element 114 of the wireless communication device 10 utilizes the radiating element 108 of the antenna 106 for sensing the environment capacitance. In other words, the present invention does not require additional receiver or sensor, but utilizes the original radiating element 108 in the antenna 106 for sensing environment capacitance. In this way, the embodiment of the present invention can prevent from affecting radiation efficiency of the antenna 106, and more importantly, only one antenna needs to be designed for various communication systems of nearing frequency band demands. Therefore, the design and manufacturing costs can be reduced, and component management is enhanced.

Note that, the wireless communication device 10 shown in FIG. 1 describes how to effectively sense an event of approach of a human body to an antenna having a DC connecting path between a radiating element and a ground terminal thereof, without adding a receiver or a sensor that may affect antenna efficiency. Those known in the art can make various modifications accordingly, and not limited herein. For example, the antenna 106 represents an antenna having a DC connecting path between the radiating element and the ground terminal, which is not limited to a specific form. Likewise, the capacitive sensing unit 114 senses environment capacitance via the radiating element 108 of the antenna 106, but the operating principle, the connecting position corresponding to the radiating element 108, the generating method, form or content of the sensing result CAP_rst, etc., are not restricted to specific rules. Furthermore, the capacitor 116 is utilized for cutting off the DC connecting path between the ground terminal 112 and the grounding unit 104, and in various applications, multiple capacitors may be required to facilitate the same objective (i.e. cut off DC signalling path between the radiating element 108 to the grounding unit 104) or special specifications (e.g. high capacitance) are needed, which are in the scope of the present invention.

Figure 2A:
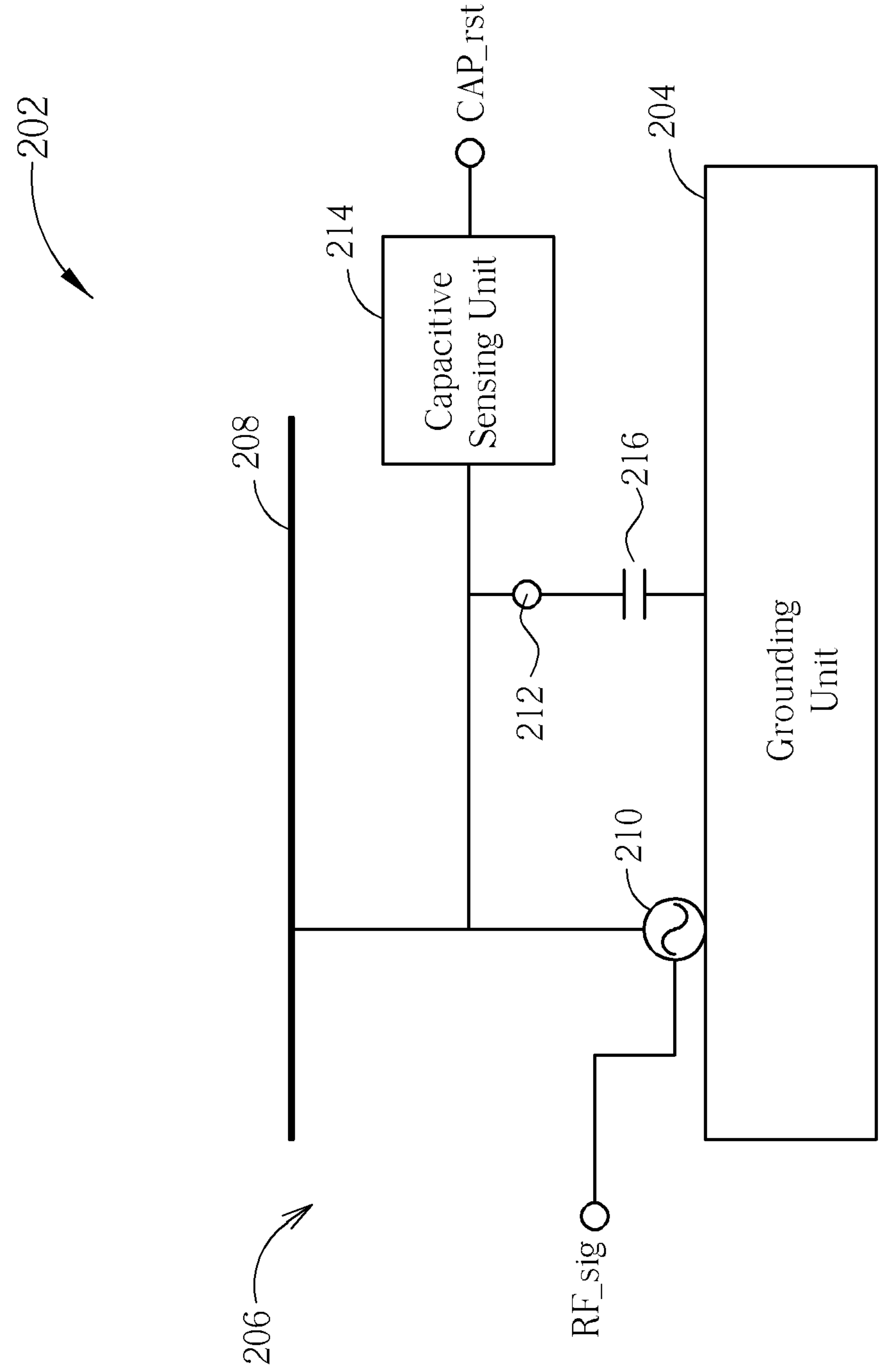
FIG. 2A is a schematic diagram of an RF device according to an embodiment of the present invention.

For example, please refer to FIG. 2A, which is a schematic diagram of an RF device 202 according to an embodiment of the present invention. The RF device 202 is an embodiment of the RF device 102 in FIG. 1; therefore, elements of same functions are given the same names. That is, the RF device 202 includes a grounding unit 204, an antenna 206, a capacitive sensing unit 214, and a capacitor 216. The antenna 206 includes a radiating element 208, a signal feed-in unit 210 and a ground terminal 212. As shown in FIG. 2A, the antenna 206 is a dual-band antenna. Besides, the capacitive sensing unit 214 and the signal feed-in unit 210 form a common node, but not limited herein, as long as the capacitive sensing unit 214 can be electrically connected to the radiating element 208. For example, FIGS. 2B and 2C show another two deployments of the capacitive sensing unit 214 respectively and are in the scope of the present invention.

Figure 2B:
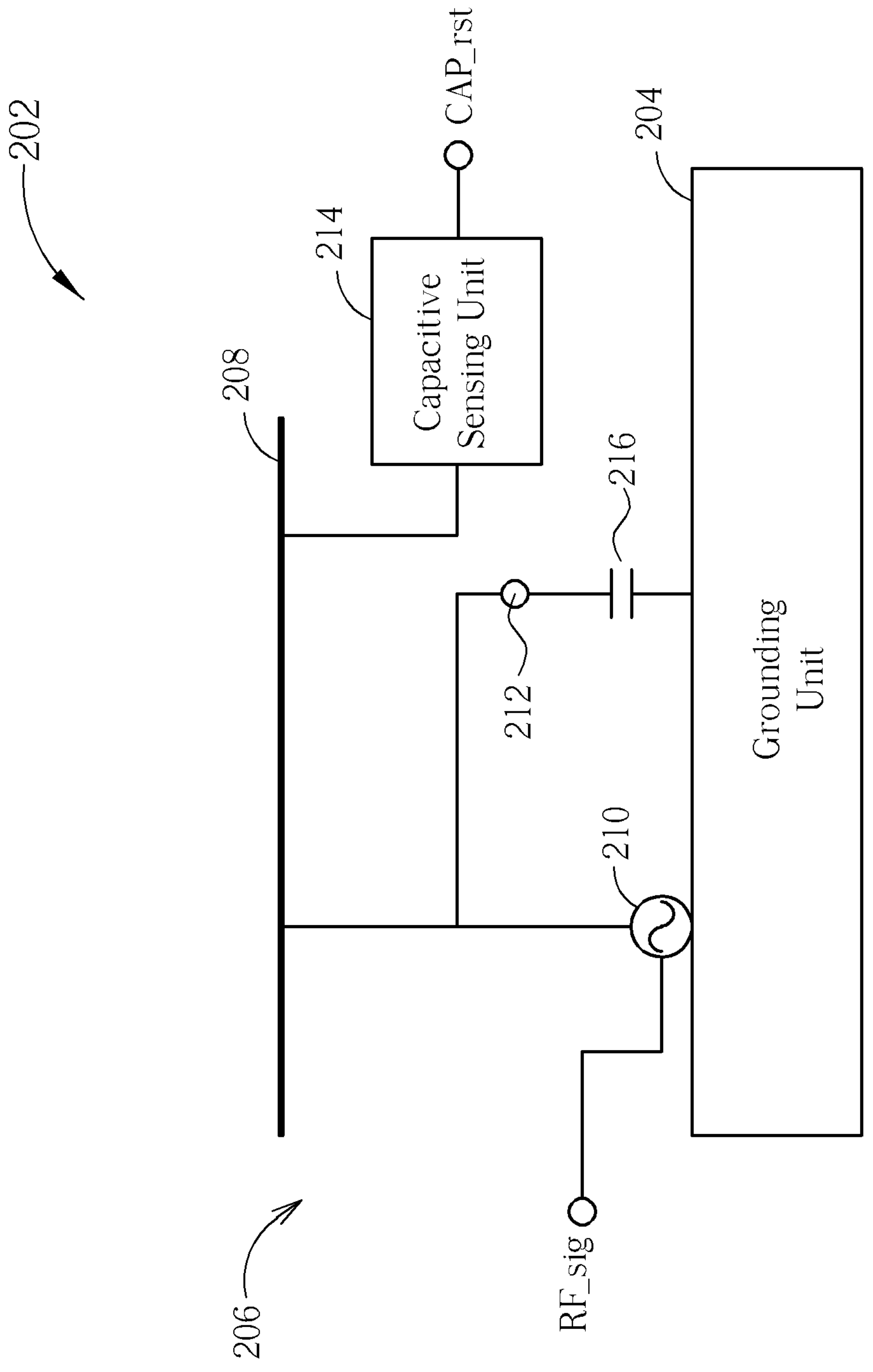
FIGS. 2B to 2D are schematic diagrams with different variations of the RF device shown in FIG. 2A.
Figure 2C:
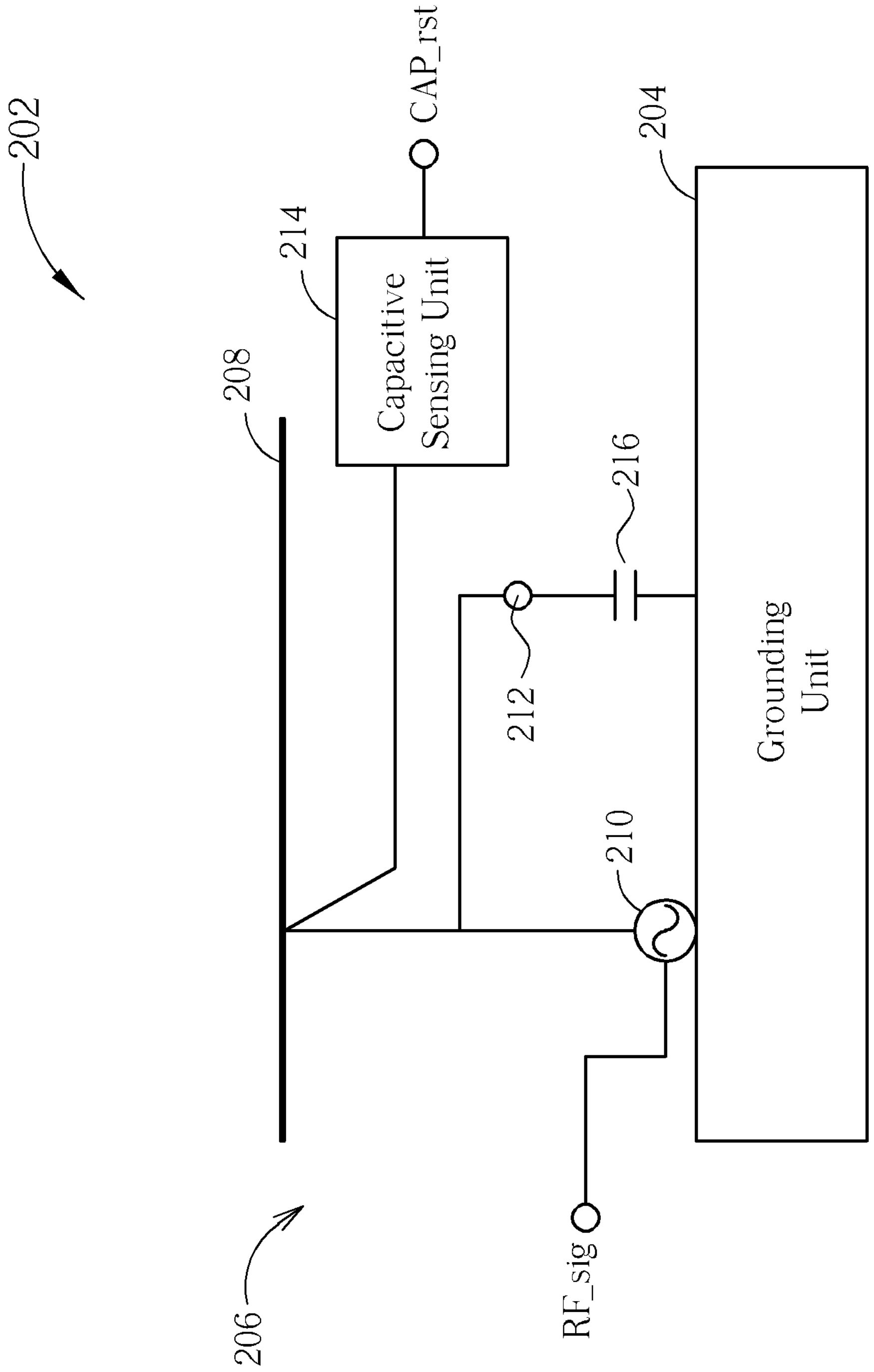
Figure 2D:
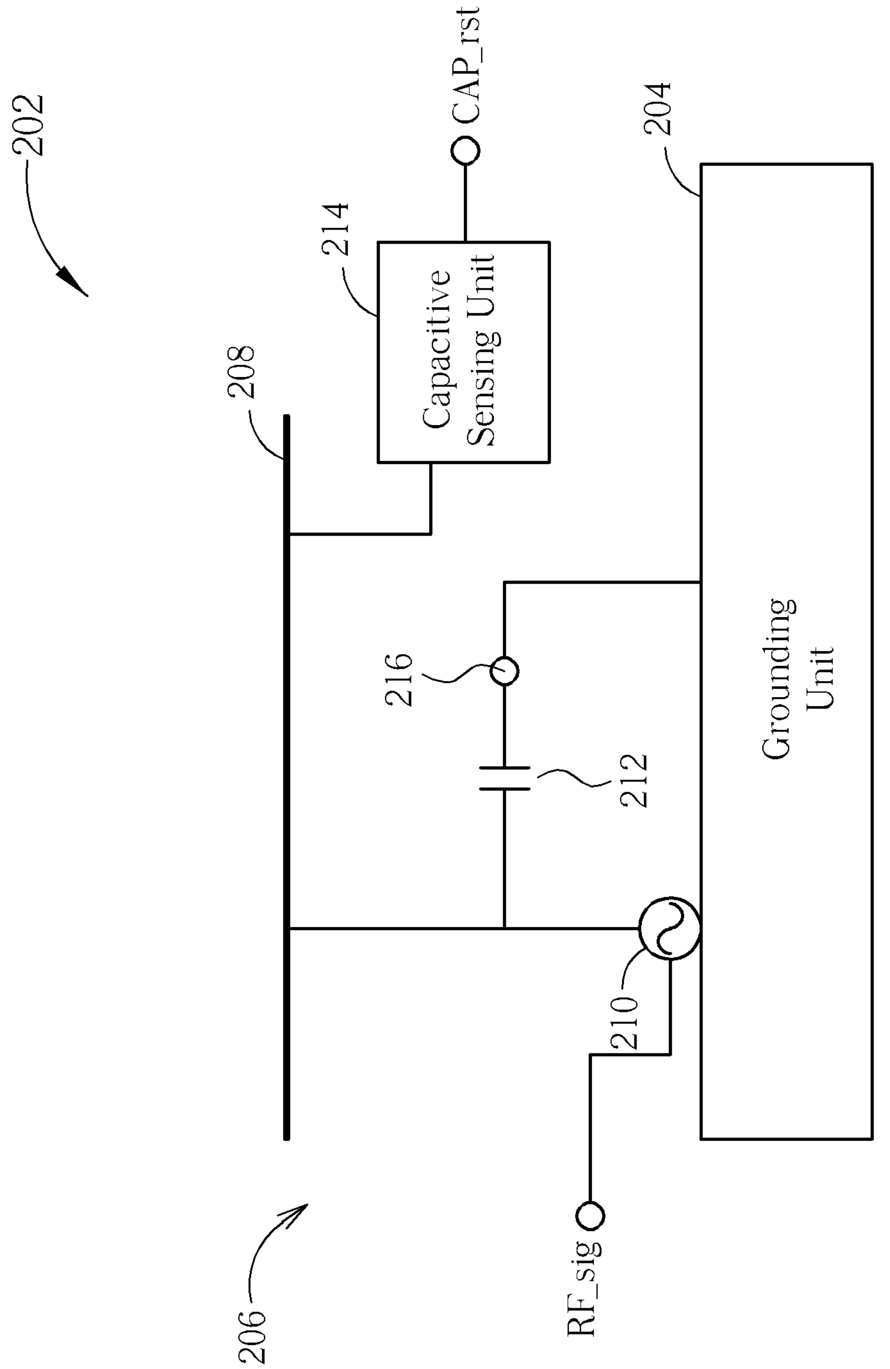

FIGS. 2B and 2C show that the deployment of the capacitive sensing unit 214 is only required to be electrically connected to the radiating element 208. In addition, the deployment of the capacitor 216 can be appropriately adjusted, as long as the DC connecting path between the capacitive sensing unit 214 and the grounding unit 204 can be cut off. In other words, when the capacitor sensing unit 214 is installed in a tail of the radiating element 208 (as the example shown in FIG. 2), the capacitor 216 can also be changed to be located at a position shown in FIG. 2D. In such a condition, the location of the ground terminal 212 is redefined. Briefly, in the present invention, the ground terminal 212 (or the ground terminal 112) is defined as a point between the radiating element 208 and the grounding unit 204, and more precisely, is to define the location of the capacitor 216 corresponding to the capacitive sensing unit 204, such that the ground terminal 212 can be adjusted adaptively.

Likewise, various types of antennas including the same characteristic (i.e. a DC connecting path between the radiating element and the ground terminal) can be derived and varied appropriately according to embodiments shown in FIGS. 2A to 2D.

Figure 3:
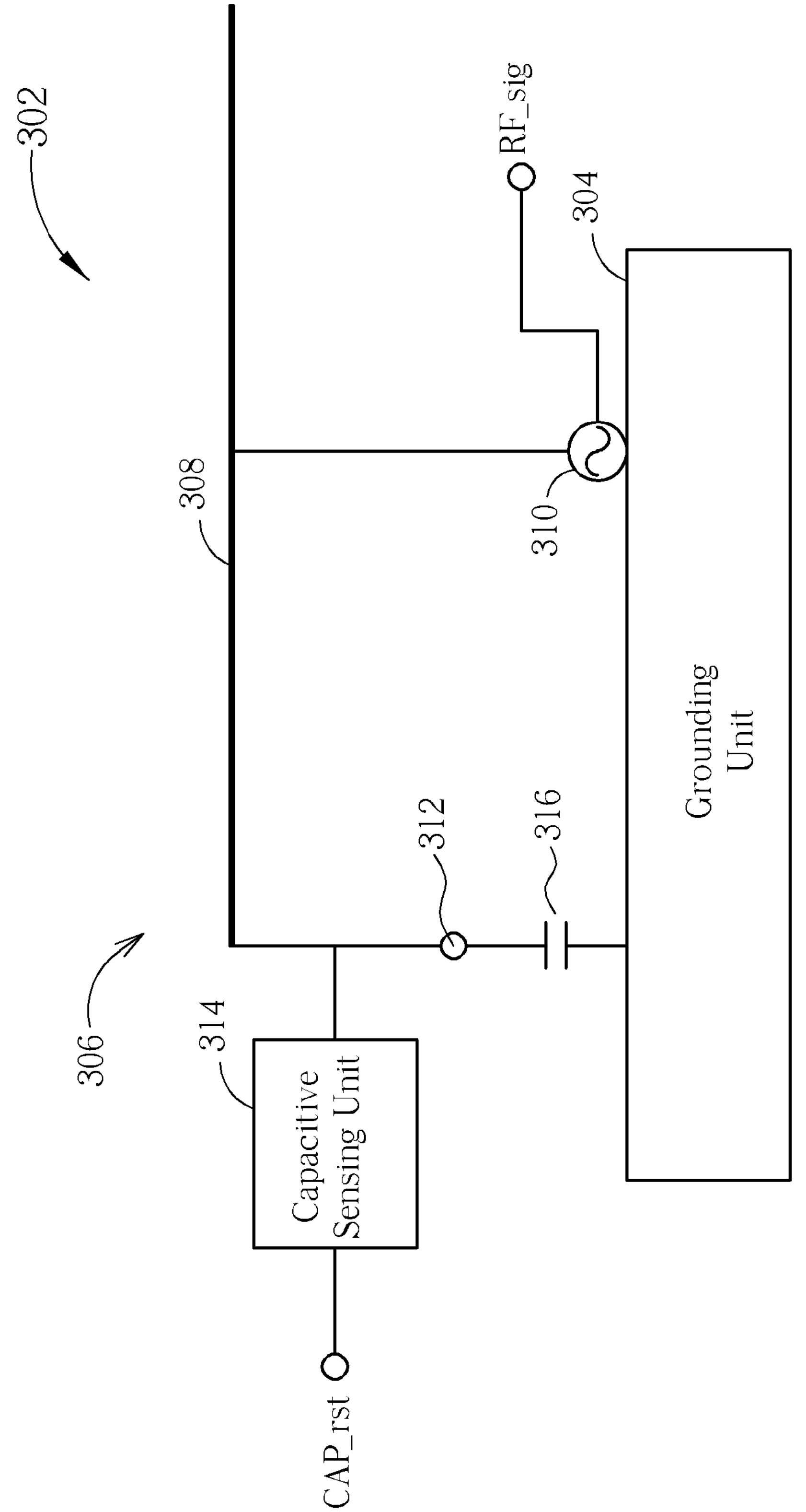
FIGS. 3 to 6, 8 to 10 are schematic diagrams according to different embodiments of the present invention, respectively.

Please refer to FIG. 3, which is a schematic diagram of an RF device 302 according to an embodiment of the present invention. The RF device 302 is an embodiment of the RF device 102 shown in FIG. 1; therefore, elements of same functions are given the same names. That is, the RF device 302 includes a grounding unit 304, an antenna 306, a capacitive sensing unit 314, and a capacitor 316. The antenna 306 includes a radiating element 308, a signal feed-in unit 310, and a ground terminal 312. As shown in FIG. 3, the antenna 306 is a planer inverted F antenna, and the capacitive sensing unit 314 is required to be electrically connected to the radiating element 308. Other modifications, such as the deployment of the capacitive sensing unit 314, the position of the capacitor 316, etc. should be readily made by those skilled in the art according to examples shown in FIGS. 2B to 2D, and are omitted for simplicity.

Figure 4:
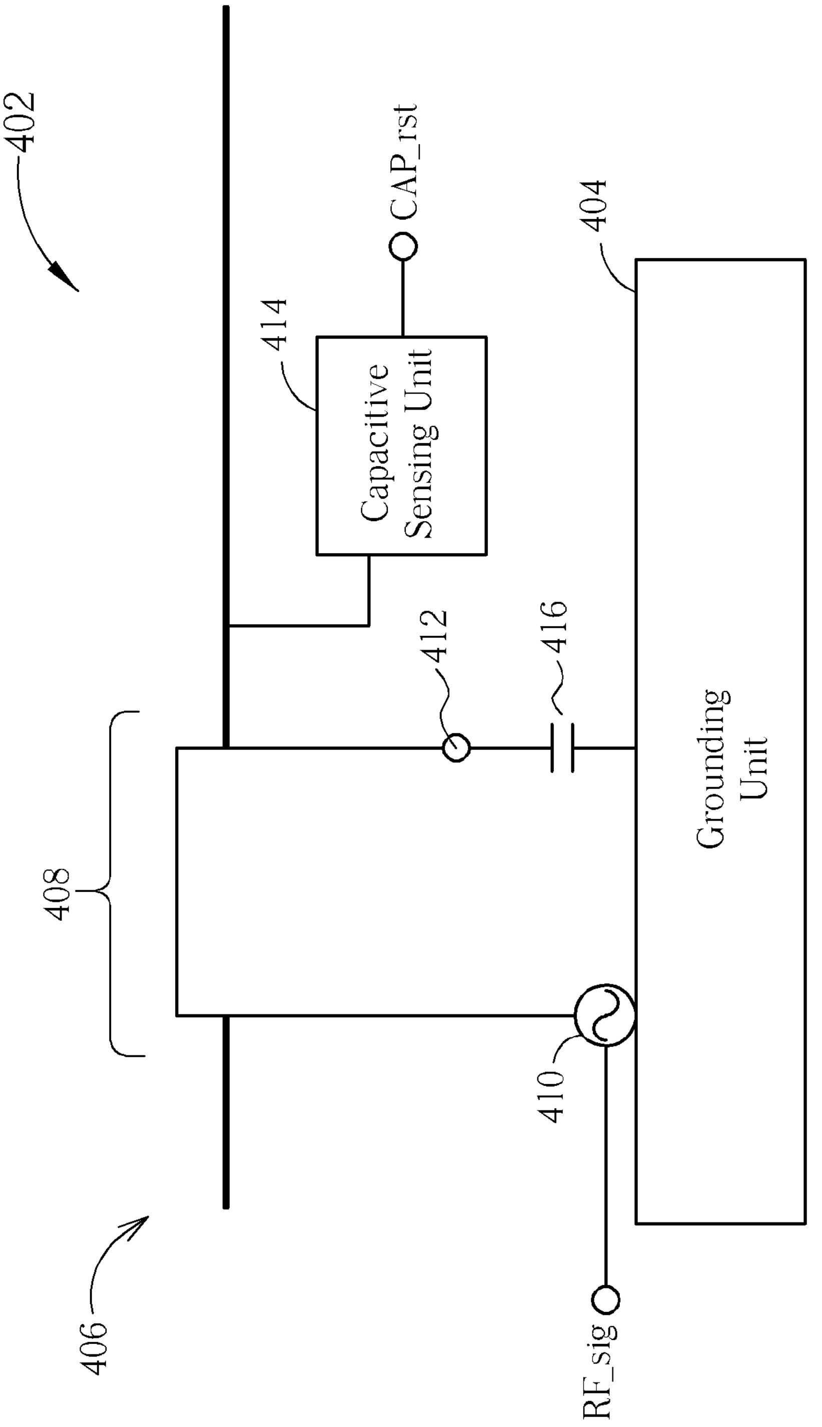

Please refer to FIG. 4, which is a schematic diagram of an RF device 402 according to an embodiment of the present invention. The RF device 402 is an embodiment of the RF device 102 in FIG. 1; therefore, elements of same functions are given the same names. That is, the RF device 402 includes a grounding unit 404, an antenna 406, a capacitive sensing unit 414, and a capacitor 416. The antenna 406 includes a radiating element 408, a signal feed-in unit 410, and a ground terminal 412. As shown in FIG. 4, the antenna 406 is a dipole antenna, and the capacitive sensing unit 414 is required to be electrically connected to the radiating element 408. Other modifications, such as the deployment of the capacitive sensing unit 414, the position of the capacitor 416, etc. should be readily made by those skilled in the art according to examples shown in FIGS. 2B to 2D, and are omitted for simplicity.

Figure 5:
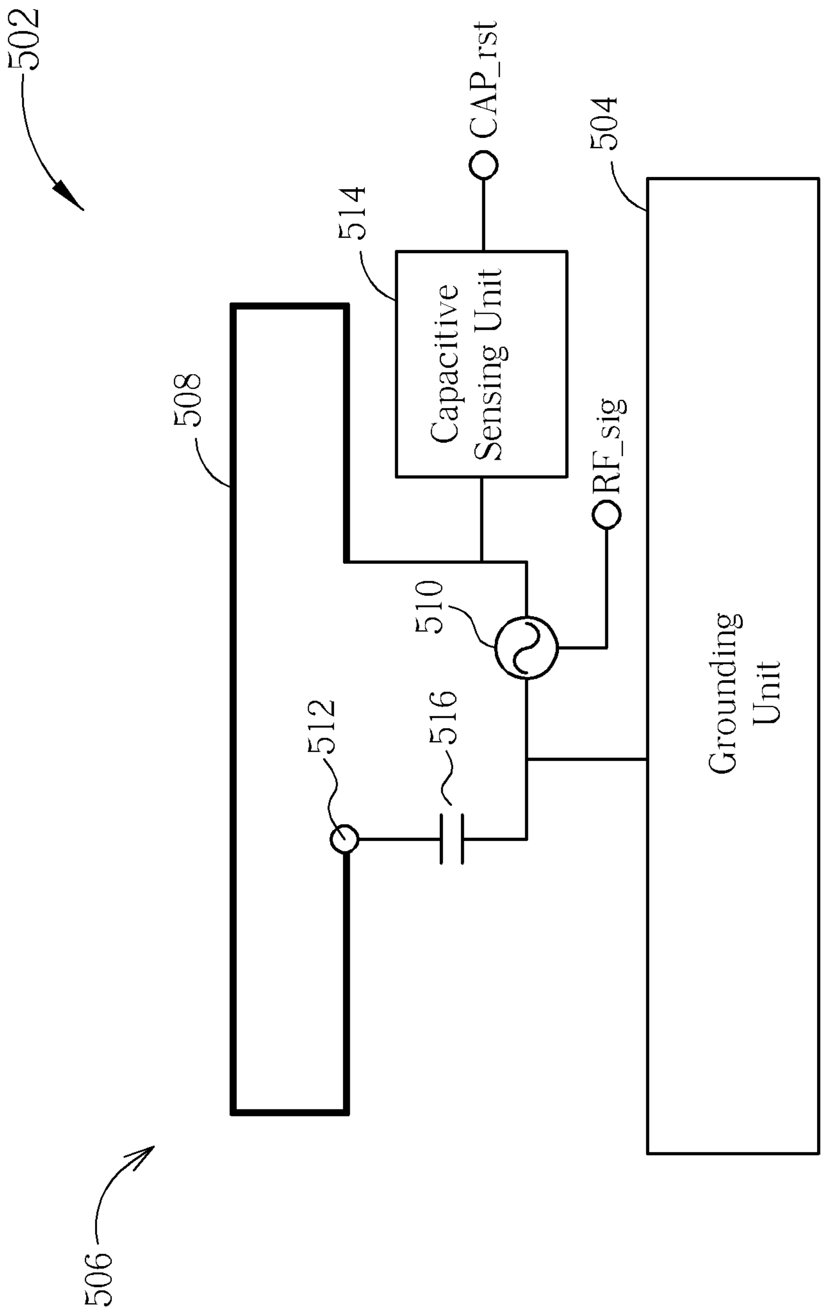

Please refer to FIG. 5, which is a schematic diagram of an RF device 502 according to an embodiment of the present invention. The RF device 502 is an embodiment of the RF device 102 in FIG. 1; therefore, elements of same functions are given the same names. That is, the RF device 502 includes a grounding unit 504, an antenna 506, a capacitive sensing unit 514, and a capacitor 516. The antenna 506 includes a radiating element 508, a signal feed-in unit 510, and a ground terminal 512. As shown in FIG. 5, the antenna 506 is a dipole antenna, and the capacitive sensing unit 514 is required to be electrically connected to the radiating element 508. Other modifications, such as the deployment of the capacitive sensing unit 514, the position of the capacitor 516, etc. should be readily made by those skilled in the art according to examples shown in FIGS. 2B to 2D, and are omitted for simplicity.

Figure 6:
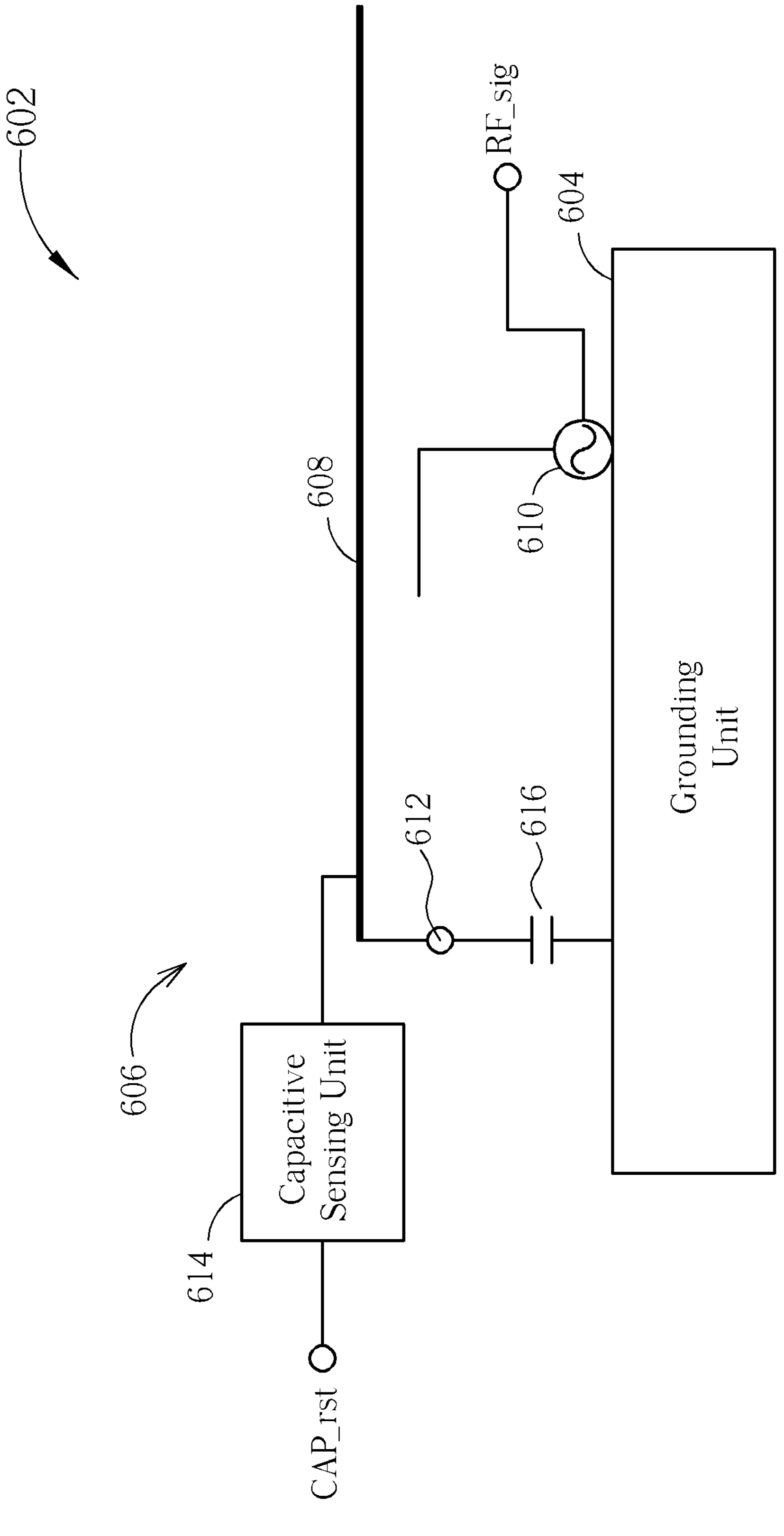

In addition, as to the wireless communication device 10 shown in FIG. 1, the feed-in method of the signal feed-in unit 110 is not restricted in the present invention. That is, the signal feed-in unit 110 can be coupled to the radiating element 108 via coupling connection or electrical connection. For example, please refer to FIG. 6, which is a schematic diagram of an RF device 602 according to an embodiment of the present invention. The RF device 602 is an embodiment of the RF device 102 in FIG. 1; therefore, elements of same functions are given the same names. That is, the RF device 602 includes a grounding unit 604, an antenna 606, a capacitive sensing unit 614, and a capacitor 616. The antenna 606 includes a radiating element 608, a signal feed-in unit 610, and a ground terminal 612. As shown in FIG. 6, the capacitive sensing antenna 614 transmits the RF signal RF_sig to the radiating element 608 by a feed-in mechanism of coupling connection. In addition, the capacitive sensing unit 614 is required to be electrically connected to the radiating element 608. Other modifications, such as the deployment of the capacitive sensing unit 614, the position of the capacitor 616, etc. should be readily made by those skilled in the art according to examples shown in FIGS. 2B to 2D, and are omitted for simplicity.

Furthermore, as described in the above, multiple capacitors may be required to cut off the DC connecting path between the radiating element 108 and the grounding unit 104 in various applications, such as slot antenna and slot coupling antenna. Such a modification of using multiple capacitors in response to multiple DC connecting paths is well known by those skilled in the art, so that the description is not given herein.

Figure 7:
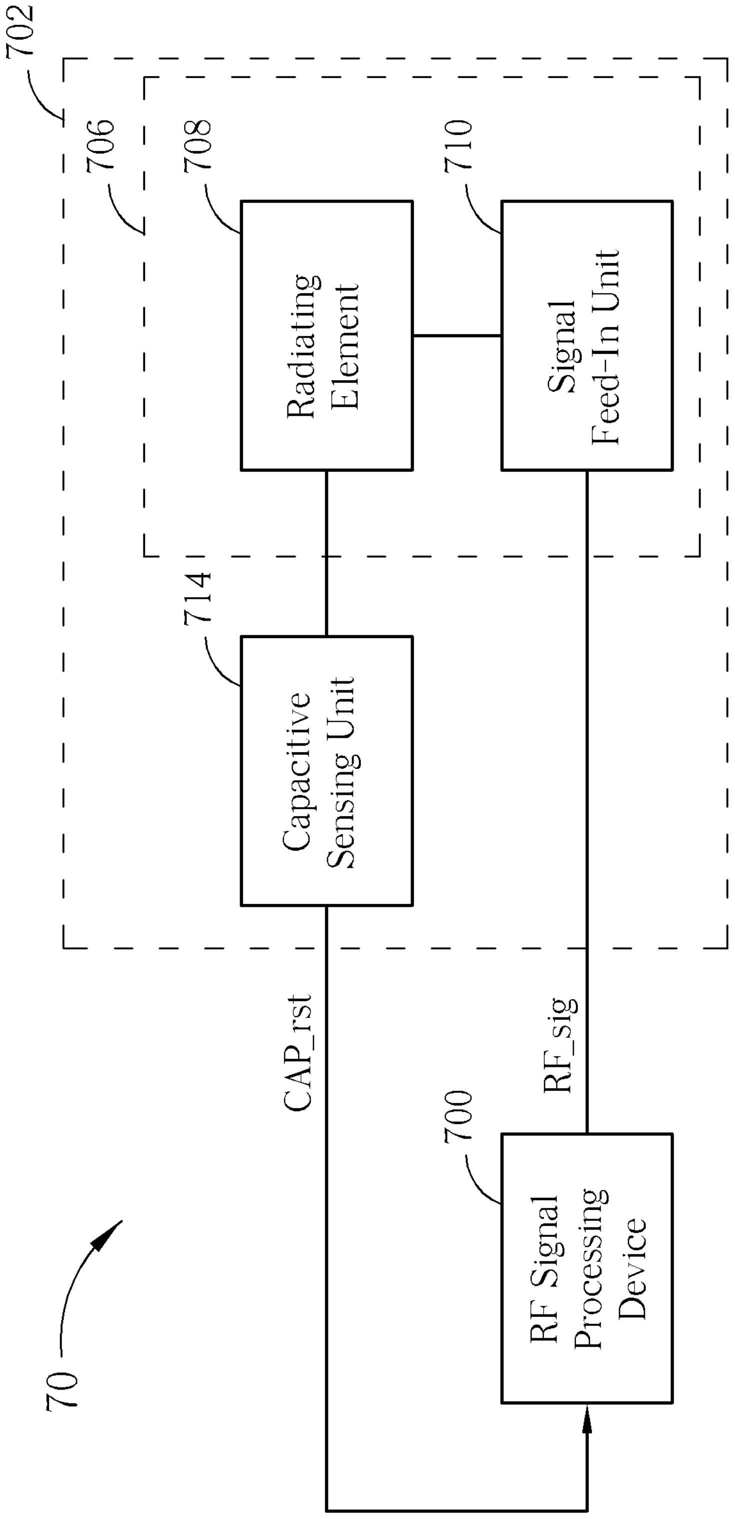
FIG. 7 is a wireless communication device according to an embodiment of the present invention.

On the other hand, as to antennas without direct-current (DC) connecting path between the radiating element and the ground terminal, please refer to FIG. 7, which is a schematic diagram of a wireless communication device 70 according to an embodiment of the present invention. The wireless communication device 70 may be any electronic product having wireless communication functionality, such as mobile phone, computer system, wireless access point, etc., and is briefly composed of an RF signal processing device 700 and an RF device 702. The RF signal processing device 700 is utilized for generating an RF signal RF_sig, and may adjust the power of the RF signal RF_sig according to a sensing result CAP_rst of the environment capacitance sent back from the RF device 702. The RF device 702 includes an antenna 706 and a capacitive sensing unit 714. The antenna 706 includes a radiating element 708 and a signal feed-in unit 710. The capacitive sensing unit 714 is electrically connected to the radiating element 708, for sensing an environment within a specific range via the radiating element 708, and generating a sensing result CAP_rst accordingly.

In brief, the operating principle of the wireless communication device 70 is similar to that of the wireless communication device 10; that is, the capacitive sensing unit 714 uses the radiating element 708 to sense the environment capacitance and transmits the sensing result CAP_rst to the RF signal processing device 700, such that the RF signal processing device 700 adjusts the power of the RF signal RF_sig accordingly. The difference between the wireless communication device 70 and the wireless communication device 10 is that there is no DC connecting path between the antenna 706 and the ground terminal, so the RF device 702 does not include a capacitor to cut off the DC connecting path between the antenna 706 and the ground terminal, as used in the RF device 102. Therefore, the wireless communication device 70 does not require additional receiver or sensor, but utilizes the original radiating element 708 in the RF device 702 for sensing environment capacitance. In this way, the embodiment of the present invention can prevent from affecting radiation efficiency of the antenna 706, and more importantly, only one antenna is needed to design for various communication systems of nearing frequency band demands. Therefore, the design and manufacturing costs can be reduced, and component management is enhanced.

Figure 8:
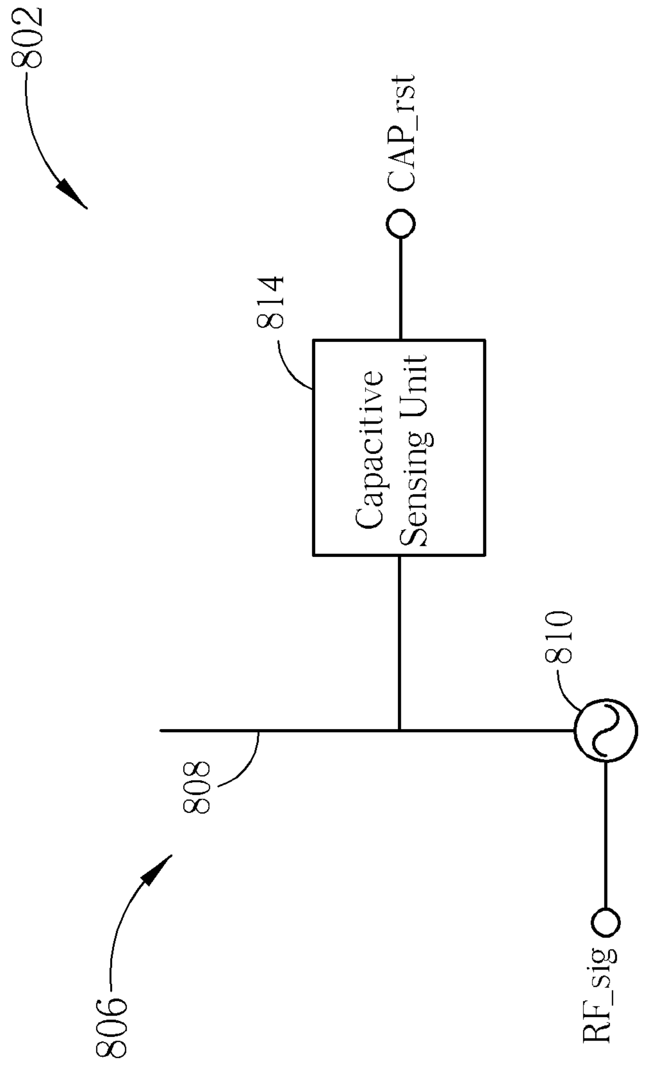

Note that, the wireless communication device 70 shown in FIG. 7 illustrates how to effectively sense an event of approach of a human body having no DC connecting path between a radiating element and a ground terminal thereof, without adding a receiver or sensor that may affect antenna efficiency. Other derivations and variations can be referred to the example described in the above and are not limited herein. For example, please refer to FIG. 8, which is a schematic diagram of an RF device 802 according to an embodiment of the present invention. The RF device is an embodiment of the RF device 702 in FIG. 7; therefore, elements of same functions are given the same names. That is, the RF device 802 includes an antenna 806 and a capacitive sensing unit 814. The antenna 806 includes a radiating element 808 and a signal feed-in unit 810. As shown in FIG. 8, the antenna 806 is a monopole antenna, and the capacitive sensing unit 814 is required to be electrically connected to the radiating element 808. Other modifications, such as the deployment of the capacitive sensing unit 814, etc. should be readily made by those skilled in the art.

Figure 9:
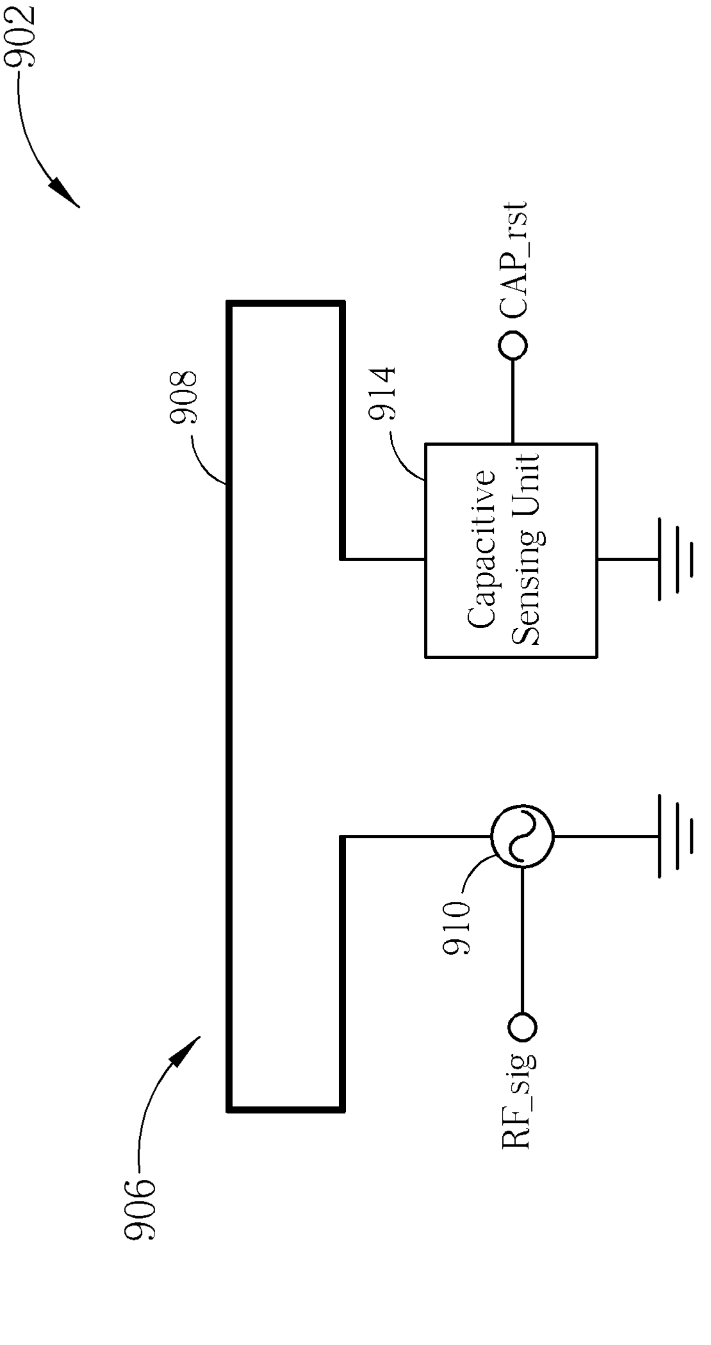

Please refer to FIG. 9, which is a schematic diagram of an RF device 902 according to an embodiment of the present invention. The RF device is an embodiment of the RF device 702 in FIG. 7; therefore, elements of same functions are given the same names. That is, the RF device 902 includes an antenna 906 and a capacitive sensing unit 914. The antenna 906 includes a radiating element 908 and a signal feed-in unit 910. As shown in FIG. 9, the antenna 906 is a loop antenna, and the capacitive sensing unit 914 is required to be electrically connected to the radiating element 908. Other modifications, such as the deployment of the capacitive sensing unit 914, etc. should be readily made by those skilled in the art.

Figure 10:
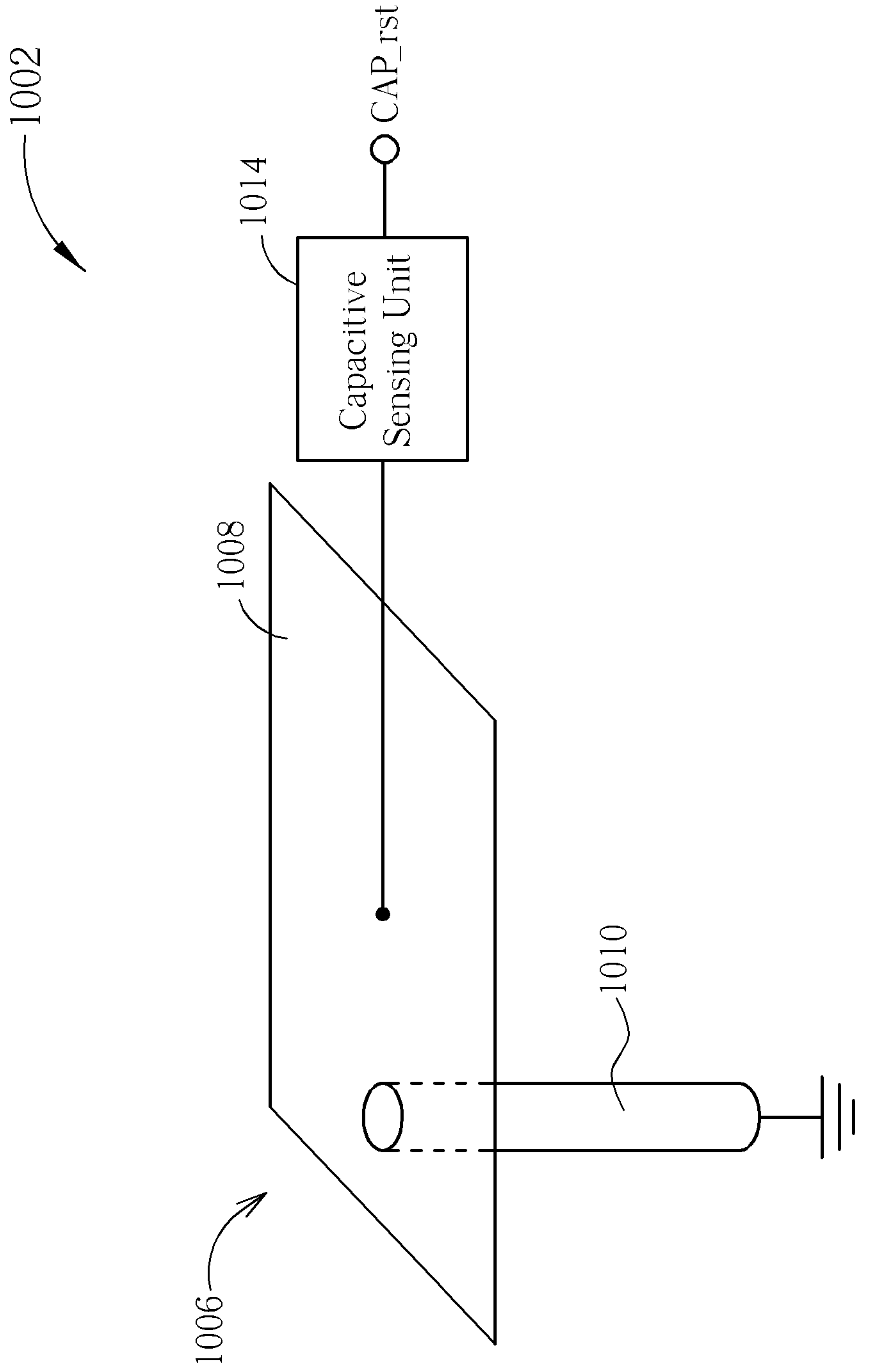

Please refer to FIG. 10, which is a schematic diagram of an RF device 1002 according to an embodiment of the present invention. The RF device is an embodiment of the RF device 702 in FIG. 7; therefore, elements of same functions are given the same names. That is, the RF device 1002 includes an antenna 1006 and a capacitive sensing unit 1014. The antenna 1006 includes a radiating element 1008 and a signal feed-in unit 1010. As shown in FIG. 10, the antenna 1006 is a patch antenna. Therefore, the capacitive sensing unit 1014 is preferably electrically connected to the radiating element 1008, but is not limited herein.

The above embodiments are classified into two categories according to whether an antenna includes a DC connecting path between the radiating element and the ground terminal, in order to narrate that the present invention dose not need additional receiver or sensor. Instead, the present invention utilizes the original radiating element in the RF device for sensing the environment capacitance. In this way, the present invention prevents from affecting radiation efficiency of the antennas, and more importantly, a single antenna needs to be designed for various communication systems of nearing frequency band demands. Therefore, design and manufacturing costs can be reduced, and component management is enhanced.

Figure 11:
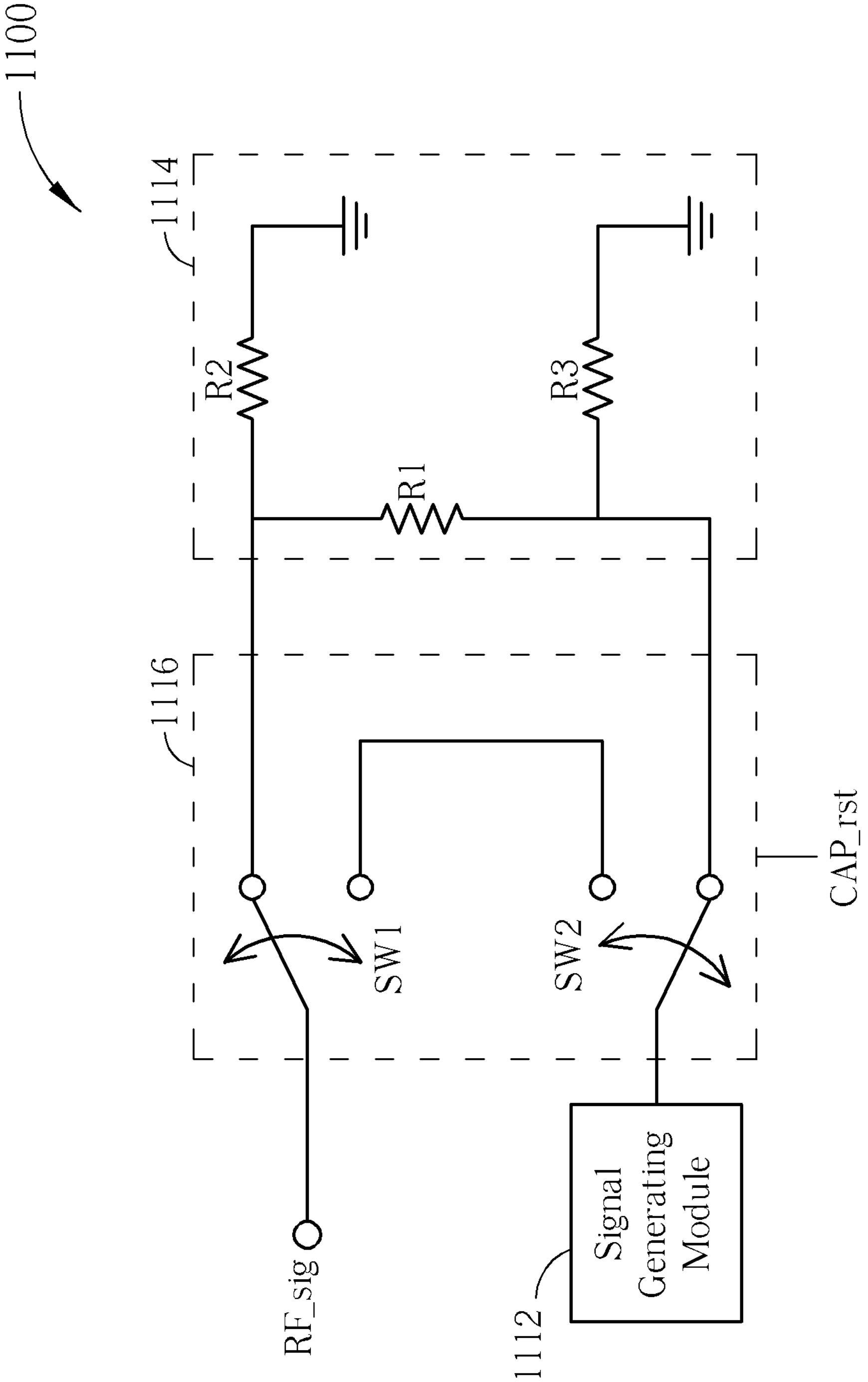
FIGS. 11 and 12 are schematic diagrams of an RF signal processing device according to different embodiments of the present invention.

On the other hand, the operating principle of the RF signal processing device 100 or the RF signal processing device 700 is not restricted to a specific rule, as long as the power of the RF signal RF_sig can be adjusted according to the sensing result CAP_rst, and more precisely, the power of the RF signal RF_sig shall be reduced when the sensing result CAP_rst indicates that a human body is approaching. For example, please refer to FIG. 11, which is a schematic diagram of an RF signal processing device 1100 according to an embodiment of the present invention. The RF signal processing device 1100 is an embodiment of the RF signal processing device 100 in FIG. 1 or the RF signal processing device 700 in FIG. 7. The RF signal processing device 1100 includes a signal generating module 1112, a decay module 1114 and a switching module 1116. The signal generating module 1112 is utilized for generating the RF signal RF_sig, while the decay module 1114, composed of resistors R1 to R3, is utilized for decaying power of signals. The switching module 1116 is coupled to the signal feed-in unit (e.g. 110 or 710), the capacitive sensing unit (e.g. 114 or 714), the signal generating module 1112 and the decay module 1114, and contains switches SW1 and SW2. The switching module 1116 is utilized for connecting the decay module 1114 between the signal generating module 1112 and the signal feed-in unit when the sensing result CAP_rst of the capacitive sensing unit indicates the environment capacitance within the specific range is larger than a default value, such that the RF signal output by the signal generating module 1112 is transmitted to the decay module 1114 and to the signal feed-in unit, for decaying signal power. On the other side, the switching module 1116 conducts the signal generating module 1112 to the signal feed-in unit directly when the sensing result CAP_rst of the capacitive sensing unit indicates the environment capacitance within the specific range is not larger than a default value, such that the RF signal output by the signal generating module 1112 is transmitted to the signal feed-in unit directly. In this way, when the sensing result CAP_rst indicates that a human body is approaching, the RF signal processing device 1100 can decrease the power of the RF signal RF_sig to avoid affecting human body. On the contrary, when the sensing result CAP_rst indicates that there is no human body approaching, the RF signal processing device 1100 keeps the power of the RF signal RF_sig to keep antenna efficiency.

Figure 12:
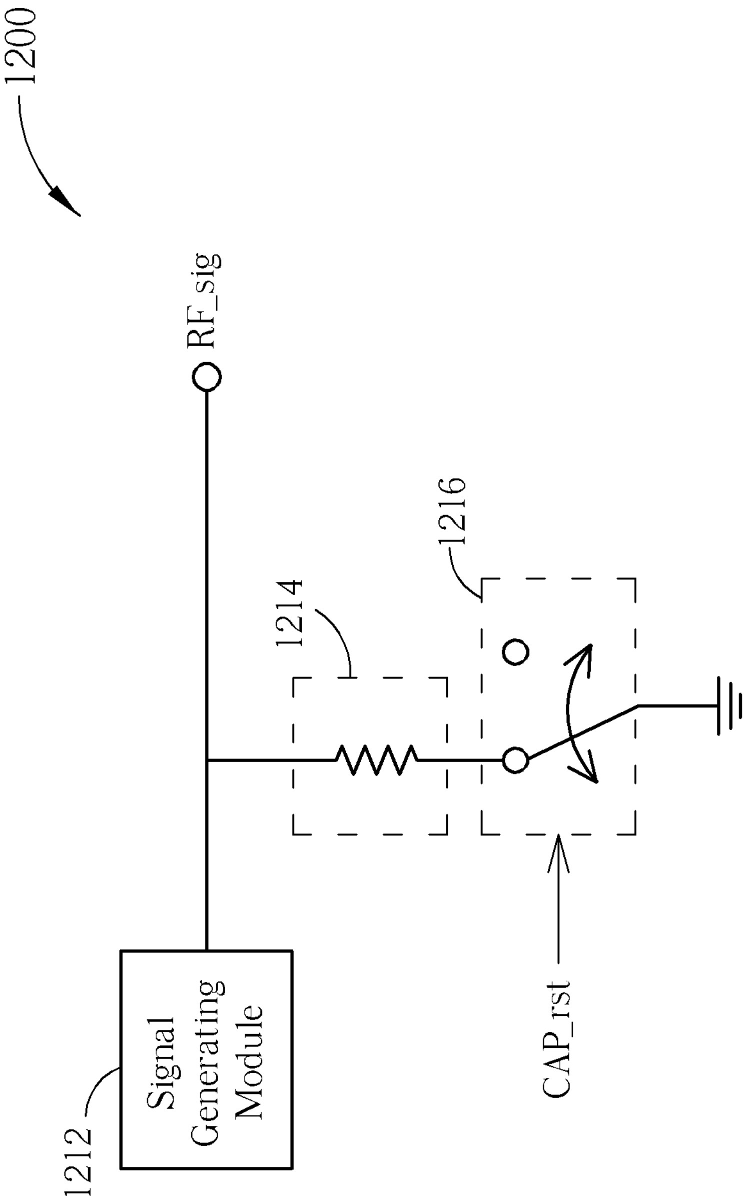

Furthermore, please refer to FIG. 12, which is a schematic diagram of an RF signal processing device 1200 according to an embodiment of the present invention. The RF signal processing device 1200 is an embodiment of the RF signal processing device 100 in FIG. 1 or the RF signal processing device 700 in FIG. 7. The RF signal processing device 1200 includes a signal generating module 1212, a resistor 1214, and a switching module 1216. The signal generating module 1212 is utilized for generating the RF signal RF_sig, and is electrically connected between the resistor 1214 and the signal feed-in unit (e.g. 110 or 710). The switching module 1216 is coupled to a system ground terminal, the capacitive sensing unit (e.g. 114 or 714), and the resistor 1214. The switching module 1216 is utilized for conducting the connection between the resistor 1214 and the system ground terminal when the sensing result CAP_rst of the capacitive sensing unit indicates that the environment capacitance within the specific range is larger than a default value, to drain a part of the RF signal output by the signal generating module 1212 into the system ground terminal, so as to decrease the power of the RF signal transmitted to the signal feed-in unit. On the contrary, the switching module 1216 cuts off the connection between the resistor 1214 and the system ground terminal when the sensing result CAP_rst of the capacitive sensing unit indicates that the environment capacitance within the specific range is not larger than a default value, such that the RF signal output by the signal generating module 1212 is transmitted to the signal feed-in unit directly, to keep the power of the RF signal RF_sig transmitted to the signal feed-in unit. In this way, when the sensing result CAP_rst indicates that a human body is approaching, the RF signal processing device 1200 can decrease the power of the RF signal RF_sig to avoid affecting human body. On the contrary, when the sensing result CAP_rst indicates there is no human body approaching, the RF signal processing device 1200 keeps the power of the RF signal RF_sig to keep antenna efficiency.

In addition, as to power supply methods of the switching modules 1116 and 1216 in the RF signal processing devices 1100 and 1200, DC power can be embedded in the RF signal RF_sig, extracted by a filter or drain circuit and supplied to the switching modules 1116 and 1216. Such skill is well known in the art.

On the other hand, in the aforementioned embodiments, the capacitive sensing units 114, 214, 314, 414, 514, 614, 714, 814, 914 and 1014 are utilized for sensing an environment capacitance of a specific field. Implementations thereof are not limited and can be appropriately adjusted according to system demands. For example, please refer to FIG. 13, which is a schematic diagram of a capacitive sensing unit 1300 according to an embodiment of the present invention. The capacitive sensing unit 1300 can replace or implement the capacitive sensing units 114, 214, 314, 414, 514, 614, 714, 814, 914 and 1014 in the aforementioned embodiments, and includes a determination unit 1302 and a capacitor C_INT. The determination unit 1302 is connected to the radiating element (e.g. 108, 208, 308, 408, 508, 608, 708, 808, 908 and 1008) through a pin PIN_sensing, for detecting whether a voltage of the pin PIN_sensing reaches a threshold voltage value V_STEP, and determining whether an external object is approaching according to whether the number of times required by charging the pin PIN_sensing to the threshold voltage value V_step exceeds N_CHARGE+N_BARRIER, so as to output the sensing result CAP_rst. The threshold voltage value V_STEP represents a threshold voltage value that the pin PIN_Sensing is completely charged by the capacitor C_INT. The number of charge N_CHARGE represents the number of times required by the capacitor C_INT charging the pin PIN_Sensing to the threshold voltage V_STEP when no external object is approaching. The number of barrier charge N_BARRIER is to avoid erroneous actions caused by slight environment variations. Therefore, when the number of charge exceeds N_CHARGE+N_BARRIER, whether an external object is approaching can be correctly determined.

In detail, the route from the pin PIN_Sensing (or the radiating element) to the ground terminal can be equivalent to a capacitor C_Sensing to the ground terminal. Note that, the capacitor C_Sensing is an equivalent capacitor, which does not exist in real structures; however, the capacitor C_Sensing is still illustrated in FIG. 13, in order to describe the operating principle of the capacitive sensing unit 1300. If there is no external object approaching, the number of times required by the capacitor C_INT charging the capacitor C_Sensing to the threshold voltage value V_STEP is N_CHARGE. In other words, the number of charge N_CHARGE is a basis for determining whether an external object is approaching, while the number of barrier charge N_BARRIER further takes slight environment variation into consideration. Therefore, when an external object is approaching and makes the number of times required by the capacitor C_INT charging the pin PIN_Sensing to the threshold voltage value V_STEP to exceed N_CHARGE+N_BARRIER, the determining unit 1302 can correctly determine an event of an external object approaching, so as to output corresponding sensing result CAP_rst (e.g. logic 1). On the contrary, when there is no external object approaching, or when an external object is approaching but the number of times required by the capacitor C_INT charging the pin PIN_Sensing to the threshold voltage value V_STEP does not exceed N_CHARGE+N_BARRIER, indicating that the event of an external object approaching is not triggered, the determining unit 1302 outputs the corresponding sensing result CAP_rst (e.g. logic 0).

Figure 13:
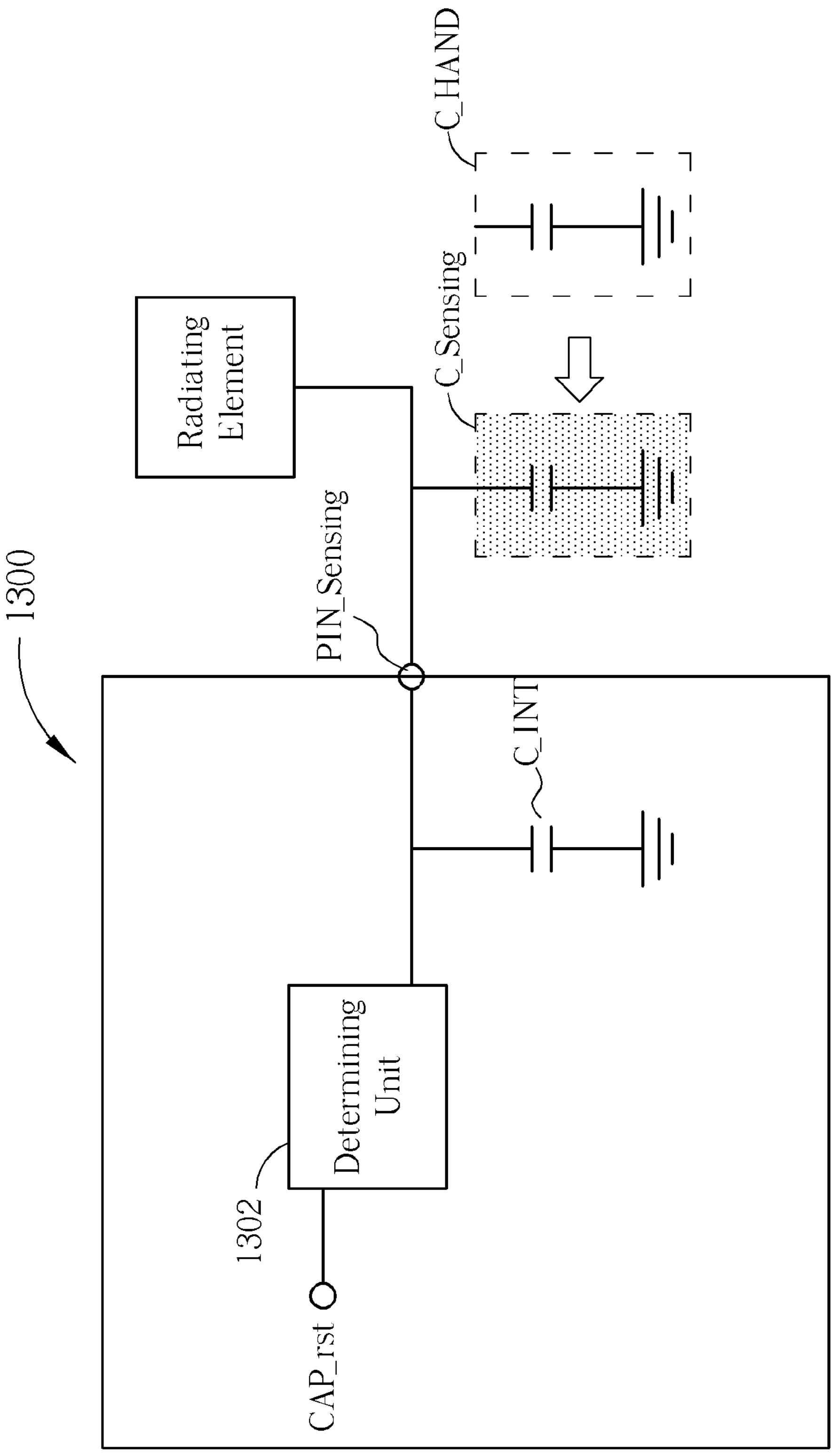
FIG. 13 is a capacitive sensing unit according to an embodiment of the present invention.

More specifically, as illustrated in FIG. 13, a relation between a human body or hand and the ground can be equivalent to a capacitor C_HAND to the ground, so that when the human body or hand is approaching the capacitive sensing unit, the capacitance of the pin PIN_Sensing increases (i.e. to C_sensing+C_HAND) because of parallel connection of the capacitors, which increases the number of times required by the capacitor C_INT charging the pin PIN_Sensing to the threshold voltage value V_STEP. Accordingly, when the number of charge exceeds N_CHARGE+N_BARRIER, an event of approach of an external object can be correctly determined, and corresponding information (e.g. logic 1) is shown in the sensing result CAP_rst, indicating that a human body or hand is detected as approaching.

Note that, FIG. 13 illustrates an embodiment of the capacitive sensing unit in the present invention. Those skilled in the art can make appropriate adjustments corresponding to system demands, and is not limited herein.

In the prior art, to reduce interference and keep antenna efficiency, a proximity sensor is utilized for sensing capacitance variation caused by approach of a human body, so as to determine an event of approach of a human body. However, the proximity sensor includes a receiver or a sensor containing metal materials, which affects antenna efficiency, and makes operating frequency narrower. In comparison, the present invention utilizes existing radiating element instead of adding receiver or sensor, to perform environment capacitance sensing. As a result, the present invention can prevent from affecting antenna efficiency, and most importantly, for various communication systems of nearing frequency band demands, only one antenna is needed, such that design and manufacturing costs can be reduced, and component management is enhanced.

In conclusion, the present invention utilizes the radiating element of the antenna to sense environment capacitance within a specific range and adjust power of RF signals accordingly, such that radiation efficiency of antenna can be maintained. Meanwhile, for various communication systems of nearing frequency band demands, only one antenna needs to be designed, such that design and manufacturing costs can be further reduced, and component management is enhanced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A radio-frequency (RF) device for a wireless communication system, the RF device comprising:
- a grounding unit, for providing grounding;
- an antenna, comprising:
  - a radiating element;
  - a signal feed-in unit, coupled to the radiating element, for transmitting an RF signal to the radiating element, to emit the RF signal via the radiating element; and
  - a ground terminal, coupled to the grounding unit;
- a capacitive sensing unit, electrically connected to the radiating element of the antenna, for sensing an environment capacitance within a specified range via the radiating element; and
- at least a capacitor, coupled between the ground terminal of the antenna and the grounding unit, for cutting off a direct-current signal route from the ground terminal to the grounding unit.

2. The RF device of claim 1, wherein the antenna is a planer inverted F antenna, a dipole antenna, a folded dipole antenna or a slot antenna.

3. The RF device of claim 1, wherein the signal feed-in unit is coupled to the radiating element by coupling connection.

4. The RF device of claim 1, wherein the signal feed-in unit is coupled to the radiating element by electrical connection.

5. The RF device of claim 1, wherein the capacitive sensing unit is further utilized for transmitting a sensing result corresponding to the environment capacitance to an RF signal processing device of the wireless communication device, and the RF signal processing device adjusts power of the RF signal according to the sensing result.

6. A wireless communication device, comprising:
- a radio-frequency (RF) signal processing device, for generating an RF signal, and adjusting power of the RF signal according to a sensing result; and
- an RF device, comprising:
  - a grounding unit, for providing grounding;
  - an antenna, comprising:
    - a radiating element;
    - a signal feed-in unit, coupled to the radiating element, for transmitting the RF signal to the radiating element, to emit the RF signal via the radiating element; and
    - a ground terminal, coupled to the grounding unit;
  - a capacitive sensing unit, electrically connected to the radiating element of the antenna, for sensing an environment capacitance within a specified range via the radiating element; and
  - at least a capacitor, coupled between the ground terminal of the antenna and the grounding unit, for cutting off a direct-current signal route from the ground terminal to the grounding unit.

7. The wireless communication device of claim 6, wherein the antenna is a monopole antenna, a loop antenna or a patch antenna.

8. The wireless communication device of claim 6, wherein the signal feed-in unit is coupled to the radiating element by coupling connection.

9. The wireless communication device of claim 6, wherein the signal feed-in unit is coupled to the radiating element by electrical connection.

10. The wireless communication device of claim 6, wherein the RF signal processing device comprises:
a signal generating module, for generating the RF signal;
a decay module for decaying signal power; and
a switching module, coupled to the signal feed-in unit, the capacitive sensing unit, the signal generating module and the decay module, for connecting the decay module to a position between the signal generating module and the signal feed-in unit when the sensing result of the capacitive sensing unit indicates the environment capacitance within the specified range is greater than a default value, such that the RF signal is transmitted to the signal feed-in unit after power of the RF signal is decayed by the decay module.

11. The wireless communication device of claim 6, wherein the RF signal processing device comprises:
a signal generating module, coupled to the signal feed-in unit, for generating the RF signal;
a resistor, coupled between the signal generating module and the signal feed-in unit; and
a switching module, coupled to the capacitive sensing unit, the resistor and a ground terminal, for conducting a connection between the resistor and the ground terminal when the sensing result of the capacitive sensing unit indicates that the environment capacitance within the specified range is greater than a default value, to drain a part of the RF signal into the ground terminal.

12. A radio-frequency (RF) device for a wireless communication device, the RF device comprising:
an antenna, comprising:
a radiating element; and
a signal feed-in unit, for transmitting an RF signal to the radiating element, to emit the RF signal via the radiating element; and
a capacitive sensing unit, electrically connected to the radiating element of the antenna, for sensing an environment capacitance within a specific range via the radiating element;
wherein the signal feed-in unit or the capacitive sensing unit cuts off a direct-current signal route from the radiating element to a ground terminal.

13. The RF device of claim 12, wherein the antenna is a monopole antenna, a loop antenna or a patch antenna.

14. The RF device of claim 12, wherein the signal feed-in unit is coupled to the radiating element by coupling connection.

15. The RF device of claim 12, wherein the signal feed-in unit is coupled to the radiating element by electrical connection.

16. The RF device of claim 12, wherein the capacitive sensing unit is further utilized for transmitting a sensing result corresponding to the environment capacitance to an RF signal processing device of the wireless communication system, and the RF signal processing device adjusts power of the RF signal according the sensing result.

17. A wireless communication device, comprising:
a radio-frequency (RF) signal processing device, for generating an RF signal and adjusting power of the RF signal according to a sensing result; and
an RF device, comprising:
an antenna, comprising:
a radiating element; and
a signal feed-in unit, for transmitting the RF signal to the radiating element, to emit the RF signal via the radiating element; and
a capacitive sensing unit, electrically connected to the radiating element of the antenna, for sensing an environment capacitance within a specific range via the radiating element to generate the sensing result;
wherein the signal feed-in unit or the capacitive sensing unit cuts off a direct-current signal route from the radiating element to a ground terminal.

18. The wireless communication device of claim 17, wherein the antenna is a monopole antenna, a loop antenna or a patch antenna.

19. The wireless communication device of claim 17, wherein the signal feed-in unit is coupled to the radiating element by coupling connection.

20. The wireless communication device of claim 17, wherein the signal feed-in unit is coupled to the radiating element by electrical connection.

21. The wireless communication device of claim 17, wherein the RF signal processing device comprises:
a signal generating module, for generating the RF signal;
a decay module, for decaying signal power; and
a switching module, coupled to the signal feed-in unit, the capacitive sensing unit, the signal generating module and the decay module, for connecting the decay module to a position between the signal generating module and the signal feed-in unit when the sensing result of the capacitive sensing unit indicates that the environment capacitance within the specified range is greater than a default value, such that the RF signal is transmitted to the signal feed-in unit after power of the RF signal is decayed by the decay module.

22. The wireless communication device of claim 17, wherein the RF signal processing device comprises:
a signal generating module, coupled to the signal feed-in unit, for generating the RF signal;
a resistor, coupled between the signal generating module and the signal feed-in unit; and
a switching module, coupled to the capacitive sensing unit, the resistor and a ground terminal, for conducting a connection between the resistor and the ground terminal when the sensing result of the capacitive sensing unit indicates that the environment capacitance within the specified range is greater than a default value, to drain a part of the RF signal into the ground terminal.

* * * * *